United States Patent
DeMotte et al.

(10) Patent No.: US 7,266,422 B1
(45) Date of Patent: Sep. 4, 2007

(54) AUTOMATED PALLETIZING CASES HAVING MIXED SIZES AND SHAPES

(75) Inventors: Donald DeMotte, Lake Orion, MI (US); Mike Poma, Leonard, MI (US); Andrew Monique, Farmington, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 0 days.

(21) Appl. No.: 10/821,764

(22) Filed: Apr. 9, 2004

(51) Int. Cl.
*G06F 7/00* (2006.01)
(52) U.S. Cl. .................. 700/217; 700/213; 414/791.6; 414/792.7; 414/801; 414/802
(58) Field of Classification Search ................ 700/217, 700/213; 414/791.4, 791.6, 792.7, 792.9, 414/793, 793.1, 794.4, 801, 802
See application file for complete search history.

(56) References Cited

U.S. PATENT DOCUMENTS

| | | | | |
|---|---|---|---|---|
| 3,586,176 A | * | 6/1971 | Rackman et al. | 414/792 |
| 4,287,459 A | * | 9/1981 | Dahlstrom | 318/568.14 |
| 4,641,271 A | * | 2/1987 | Konishi et al. | 700/217 |
| 4,692,876 A | * | 9/1987 | Tenma et al. | 700/249 |
| 5,098,254 A | * | 3/1992 | Becicka et al. | 414/792.9 |
| 5,163,808 A | * | 11/1992 | Tsubone et al. | 414/791.8 |
| 5,175,692 A | | 12/1992 | Mazouz et al. | |
| 5,203,671 A | * | 4/1993 | Cawley et al. | 414/791.6 |
| 5,473,545 A | * | 12/1995 | Schausten | 700/215 |
| 5,501,571 A | | 3/1996 | Van Durrett et al. | |
| 5,613,826 A | * | 3/1997 | Scott | 414/802 |
| 5,738,484 A | * | 4/1998 | Taylor | 414/788.1 |
| 5,844,807 A | * | 12/1998 | Anderson et al. | 700/217 |
| 5,908,283 A | | 6/1999 | Huang et al. | |
| 6,055,462 A | * | 4/2000 | Sato | 700/217 |
| 6,871,116 B2 | * | 3/2005 | Brust et al. | 700/245 |

* cited by examiner

*Primary Examiner*—Khoi H. Tran
(74) *Attorney, Agent, or Firm*—Fraser Clemens Martin & Miller LLC; William J. Clemens (57) ABSTRACT

A method for stacking cases on a pallet includes supplying cases to a buffer, determining physical characteristics of buffer cases including dimensions of a case base and case height, and determining available positions on the pallet where a buffer case can be placed. Rules for selecting a case from the buffer for placement on the pallet are applied to at least a portion of the buffer cases to identify a selected buffer case that satisfies at least one of the rules and a corresponding place on the pallet for the selected case. Then the selected case is removed from the buffer and placed on the pallet in the corresponding place by an industrial robot.

22 Claims, 9 Drawing Sheets

AUTOMATED PALLETIZING CASES HAVING MIXED SIZES AND SHAPES

BACKGROUND OF THE INVENTION

1. Field of the Invention

This invention relates to stacking cases of various size, shape, and weight on a pallet for transport. More particularly the invention pertains to a computer-controlled method for selecting cases presented in random order and using an industrial robot to produce a stable stack of cases on the pallet.

2. Description of the Prior Art

In the transportation and distribution of goods, cases, boxes or cartons containing goods are stacked on a portable platform or pallet that is readily moved by a vehicle from a palletizing area. The cases frequently vary in size, shape, and weight and usually arrive in a random order in the area where they are placed on the pallets. This usually results in a random stacking of the cases until the pallet is either completely full or cannot be stacked higher. The pallets are usually then enveloped by shrink-wrap plastic material to prevent inadvertent displacement of the cases during shipping.

Attempts have been made to load unequal size and weight cases by automated palletizing systems. In a first system, an operator having knowledge of the size and weight of all of the cases to be loaded indicates to a computer, with the aid of a graphic terminal, the location where each case should be placed on the pallet. The computer determines the optimum loading sequence, another device puts the cases in that optimal order, and the cases are loaded on the pallet by a robot arm controlled by the computer. U.S. Pat. Nos. 4,641,271; 4,692,876 and 4,746,255 describe palletizing systems that require prior knowledge of all of the cases to be palletized. The processes they describe are slow, and the palletized stack is not optimized for stability.

It is difficult to load cases manually onto a pallet so that the stacked cases are stable when different size and weight cases are presented in random order for palletizing. To overcome this difficulty, industrial robots are used to stack cases onto pallets when the cases are of the same size and weight, or the cases arrive in a predetermined order at the palletizing area. Expert systems are now available, which automatically determine the configuration for different cases having various sizes and weights, but without operator assistance, provided the system has prior knowledge of the size and weight of every case in the entire pallet load.

U.S. Pat. No. 5,175,692 describes a method and computer-assisted apparatus for automatically palletizing parcels of various sizes, shapes and contents, which arrive in random order at a pickup point to be transferred onto a pallet. The system includes an expert computer program, which uses attribute factors of the parcels, applies predetermined rules to assign a space for the parcel on the pallet, and communicates coordinates of the assigned space to a material handling robot.

U.S. Pat. No. 5,501,571 describes an automatic palletizer system that loads a random set of different size and weight cases onto a pallet. As the cases pass along a conveyor, their weight, dimensions, and contents are determined, a processor continuously maps the optimal pallet configuration for the remaining cases as the pallet is loaded, and reshuffles the sequence of a limited number of cases to improve the final pallet configuration.

U.S. Pat. No. 5,908,283 describes a method and apparatus for palletizing rectangular packages received in random size and weight. A corner-based modeling system is used to assist in evaluating possible placements of packages accumulated on a line conveyor, and a placement evaluation process is used to select a best package placement based on heuristic analysis. Statistically-based measurement and comparison is used to assist in the evaluation process.

In methods that employ multiple rules to determine a location for a case on a pallet, a choice among the results of applying the various rules is made with reference to a best score or single rule approach, which may not produce an optimal choice. Often the methods require large computing capacity to process a large number of pallets in a limited time, or to control several robots in real time. Current methods often produce a stacked pallet that has poor stability because of emphasis placed on maximizing pallet volume. This emphasis tends to create towers of similar shaped cases. Because current methods place cases in inaccessible cavities between previously stacked cases, complicated tooling and controls are required to access the cavities.

Because of these deficiencies, a need remains for an automated palletizing system that can continually determine an optimal case configuration while loading the pallet as cases of mixed size, shape and weight are presented randomly to a buffer for stacking on the pallet.

SUMMARY OF THE INVENTION

The method of this invention uses various methods or rules in a priority sequence to choose a case, or series of cases, for placement on a pallet. The rules achieve optimal use of space on the pallet and ensure stability of the stacked cases. For example, a Full Layer Rule is used when a group of cases having the same dimension would fill a vacant area of the pallet making a full layer, thereby creating a large flat surface for subsequent cases. A computer processor remembers for each rule each decision made in a prior occurrence of a group of cases in the buffer from which cases are selected for placement. This memory provision allows the control algorithm to use the rule so that processing time is minimized. For example, the Full Layer Rule calculates all of the positions for the layer and uses them in series until a current pallet the layer is filled completely.

Stability, a criterion used in all rules to determine whether a case can be placed on a pallet, involves a dynamic calculation that determines whether a case will fall due to external forces, such as starting and stopping a fork lift truck that carries filled pallets among various locations in a warehouse. If a case or a stack of cases, sometimes called a tower, would be unstable during pallet conveyance, the case is not placed. Every rule checks the stability of the case being evaluated for placement. If a buffer case selected for placement at a pallet position by application of a rule fails the stability test, the rule is applied to other cases and other pallet positions. If no combination meets the criteria for this rule and the stability criteria, the next rule in priority order is applied. The other rules are applied to the buffer cases with respect to each available position on the pallet until a case is selected that meets the stability test and satisfies one of the rules.

Rather than maintain a simple three-dimensional representation of the pallet and placed boxes, a concept of regions is used to define the currently available places to place cases on the pallet. Each region is a plane on the pallet having an origin. The location of the origin expressed in X, Y, Z coordinates, and the planar dimensions of each region are retained by the computer. A case, preferably, is placed in one corner of the region, closest to pallet origin and farthest from the robot 14. The case can be placed at other corners of the region to maintain an even outside edge, to provide for better stability, or to utilize the available space in an efficient manner. Each place position for a case selected from the buffer 18 is located in a region. Each selected case has a corresponding region, place position in the region, and alignment or arrangement of the selected case in the region. This ensures the rules of selection and placement will produce an efficiently loaded, stable pallet. The use of regions reduces the number of potential place positions, the number of decisions required while executing the algorithms, and shortens computer execution time. The execution time required by a method according to this invention is less than 50 m-sec per case, compared to 100-500 m-sec per case using conventional, commercially available methods.

These and other advantages are realized with a palletizing method of this invention for stacking cases on a pallet that includes supplying cases to a buffer, determining physical characteristics of buffer cases including dimensions of a case base and its height, and determining available positions on the pallet where a buffer case buffer can be placed on the pallet. Rules for selecting a case from the buffer for placement on the pallet are applied to at least a portion of the buffer cases to identify a selected buffer case that satisfies at least one of the rules and a corresponding place on the pallet for the selected case. Then the selected case is removed from the buffer and placed on the pallet in the corresponding position, preferably by an industrial robot.

Various objects and advantages of this invention will become apparent to those skilled in the art from the following detailed description of the preferred embodiment, read in light of the accompanying drawings.

BRIEF DESCRIPTION OF THE DRAWINGS

These and other advantages of the present invention will become apparent to those skilled in the art from the following detailed description of a preferred embodiment when considered in the light of the accompanying drawings in which.

DETAILED DESCRIPTION OF THE PREFERRED EMBODIMENT

Figure 1:
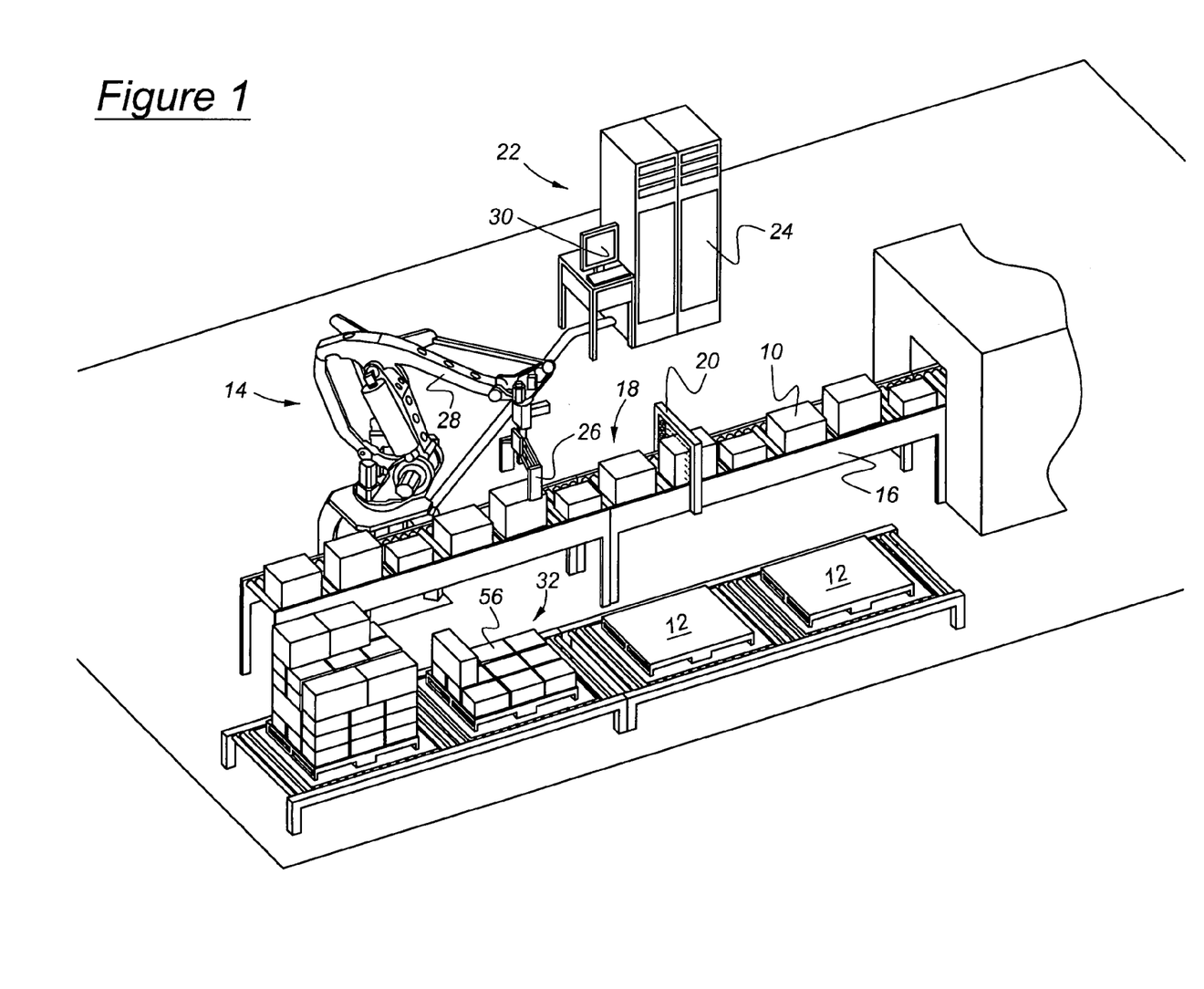
FIG. 1 is a view of an automated palletizing system.

A representative arrangement of the equipment used to stack cases 10 on pallets 12 using an industrial robot 14 controlled according to this invention is shown in FIG. 1. Cases 10 are transported in a random sequence of mixed sizes, shapes, weight and content, etc. on a conveyor 16, which delivers the cases to a buffer or queue 18 containing cases located within the range of access of the robot arm 14, which lifts cases from the buffer and places them on a pallet under computer control. This process is referred to as automated palletizing.

The cases 10 pass through a scanner 20, such as bar code reader, which scans the outer surfaces of the cases and reads a UPC bar code located there. Information obtained by reading the bar code is conveyed to a computer system 22, which determines with reference to the bar code information in a database stored in electronic memory accessible to the computer processor. The information preferably includes, but is not limited to dimensions of each case, i.e., the length and width of its base and height, its contents, weight, and fragility. The scanner may read, instead, a product identifier, which is an index to a lookup table stored in electronic memory containing product information. As another option, the scanner may read a routing identifier, which is an index to a table containing a product identifier and order information contained in a lookup table stored in electronic memory. As another option, a light tunnel or dimensional scanner can be used to measure the dimensions of each case.

Preferably scanner 20 communicates information to a conveyor PLC, which sends the information to a stacking PC, which executes control algorithms and determines place positions on the pallet 12 for buffer cases. A robot controller controls the robot arm 28 and grippers 26 on the robot arm. In FIG. 1, the conveyor PLC, stacking PC, and robot controller are identified generally as 24.

The computer system 22 uses information, data and rules contained in control algorithms stored in its memory to determine from repeated execution of the control algorithms a place position on the pallet 12 where a case from the buffer 18 should be stacked on a pallet currently being filled. After determining, in accordance with the rules and procedures, a place position on the pallet for the next case to be stacked there, that information is communicated to a robot controller 22, which directs the robot 14 to the buffer 18. The case is then lifted from the buffer by the grippers 26 located at the end of the robot arm 28, moved to the destination place position, rotated to the proper alignment, placed in the place position, and released from the grippers 26. Information produced by the computer from execution of the control algorithms can be displayed on a CRT computer screen 30, where an operator, who observes the operation, reads the screen.

The control algorithms are organized for serial execution by the computer and application in a predetermined order, each rule being designed to address a particular aspect of producing a stable, compact stack of palletized cases. Rather than make the same decision by evaluating various factors during each execution of the control algorithm, each rule was designed to evaluate a unique condition that might arise. For example, the Full Layer rule evaluates whether a number of cases is available in the buffer and a single flat surface is available and whether an interlocked pattern can be made. In this manner, a pattern can be generated that covers the available space and leaves a new flat surface for subsequent cases. Each rule was designed to maximize the use of the pallet while maintaining stability. The priority of the rules determines the order in which the conditions are checked.

Rather than maintain a simple three-dimensional representation of the pallet and placed boxes, a concept of regions is used to define the currently available places to place cases on the pallet. Each region is a plane on the pallet having an origin. The location of the origin expressed in X, Y, Z coordinates, and the planar dimensions of each region are retained by the computer. A case, preferably, is placed in one corner of the region, closest to pallet origin and farthest from the robot 14. The case can be placed at other corners of the region to maintain an even outside edge, to provide for better stability, or to utilize the available space in an efficient manner. Each position for a case selected from the buffer 18 is located in a region. Each selected case has a corresponding region, place position in the region, and alignment or arrangement of the selected case in the region. This ensures the rules of selection and placement will produce an efficiently loaded, stable pallet. The use of regions reduces the number of potential place positions, the number of decisions required while executing the algorithms, and shortens computer execution time.

Each case is evaluated for potential placement in available unfilled region on the pallet being stacked. The case in the buffer 18 that is the best choice among all the cases currently in the buffer is chosen for placement. The computer maintains a three dimensional model of the current available regions on the pallet being stacked 32, and repetitively updates pertinent information about conditions on the pallet including the lateral dimensions and height of regions to be filled, and the height of filled regions, and their position relative to the unfilled regions. The computer system 22 updates the model as each case is stacked on the pallet.

Figure 2:
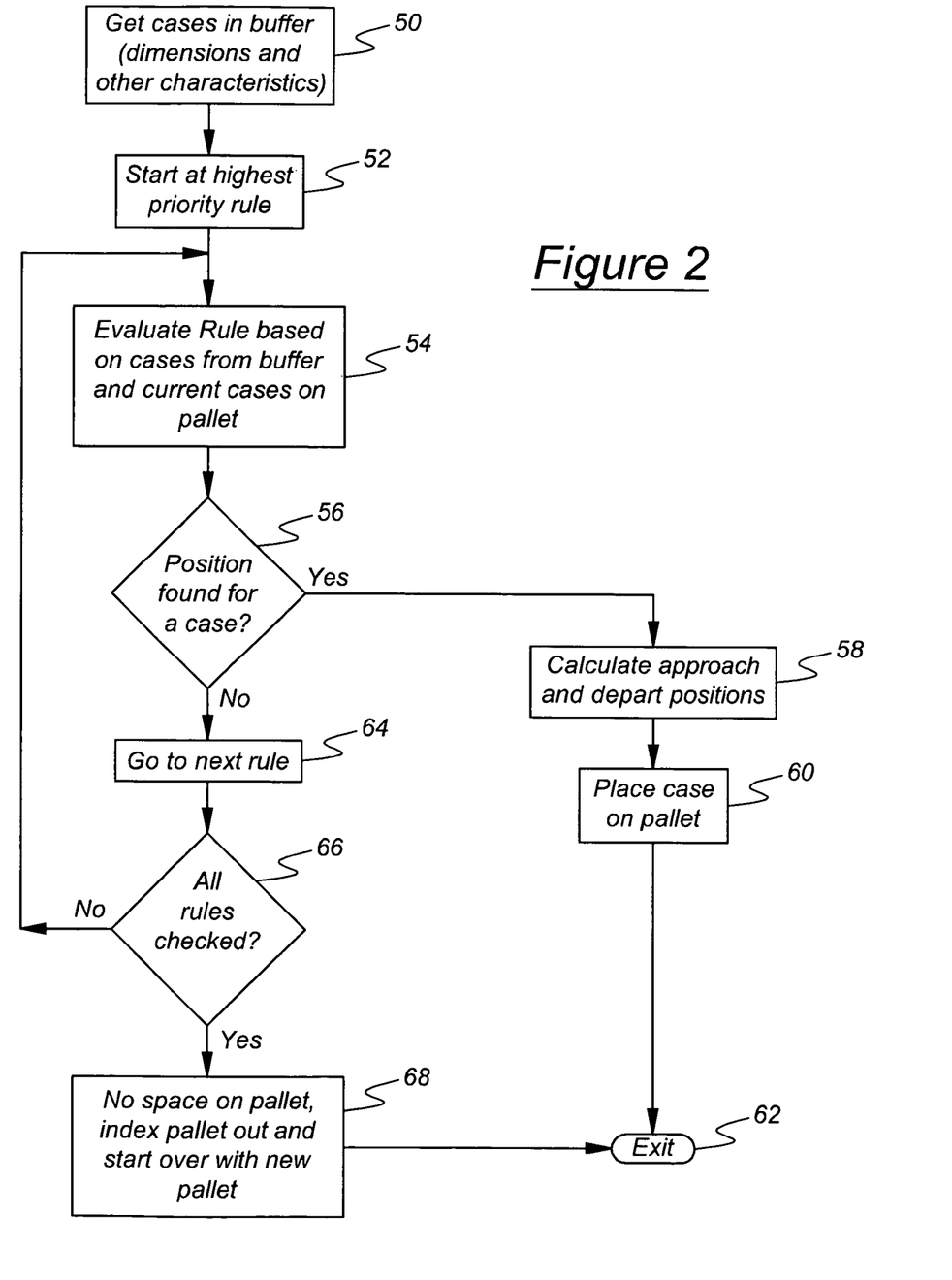
FIG. 2 is a logic flow chart, which shows the general steps involved in practicing the present invention.

The rules are described next with reference to criteria used in their application to case selection and placement. FIG. 2 is a logic flow diagram representing generally the method for palletizing cases according to this invention. At step 50, the optical scanner 20 determines the dimensions of the cases in the buffer 18, and the data are stored in electronic memory accessible to the processor. At 52, a control algorithm begins execution at the highest priority rule. At step 54, the rule is evaluated based on the current cases in the buffer and the place positions 56 on the current pallet 12 where cases can be placed.

An inquiry is made at step 56 to determine whether a position is found on the pallet for a case currently in the buffer 18. If the outcome of inquiry 56 is logically positive, the path for the robot arm 14 to the selected case is established at 58 by the robot controller 24, the selected buffer case is removed from the buffer and placed on the pallet in its designated position 60, and the control algorithm is exited 62. When the buffer is refilled with cases, the control algorithm is repeated. If, however, the outcome of step 56 is logically negative, at 64 the next rule and all subsequent rules are applied sequentially to each buffer case until, at 66 all the rules are applied to all buffer cases, and either a selected case is placed on the pallet at step 60, or at step 68 no space is available on the pallet for a current buffer case, and a new pallet is brought to the palletizing position.

The computer stores in memory the results produced by the last application of each rule to the buffer cases for the special condition where a group of cases having a particular dimension or another characteristic is selected for placement. Usually this occurs when a pallet layer is unfilled and cases of a particular size that would fill the layer, preferably with a flat upper surface, are present in the buffer. The algorithm then raises the priority of that rule relative to the other rules and applies it to buffer cases before the other rules are applied. This reprioritization of the rules further reduces computer processing time. Using this technique, the Full Layer Rule, for example, will determine all of the place position in the regions of the current layer, and fill them serially until the layer is completed.

The Full Layer Rule, set forth graphically and discussed next with reference to FIGS. 3 and 4, determines whether one product type in the buffer will fill the lowest remaining area on a pallet, and whether that area is a full pallet layer. If the lowest layer is a full layer and there is a sufficient quantity of one product type to fill the whole layer, then the processor decides to use the whole layer for that product type and saves that decision in electronic memory. The cases may have the same regular alignment 70, a mixed alignment 74, 75, or a pinwheel pattern 76, as shown in FIG. 4.

Figure 3:
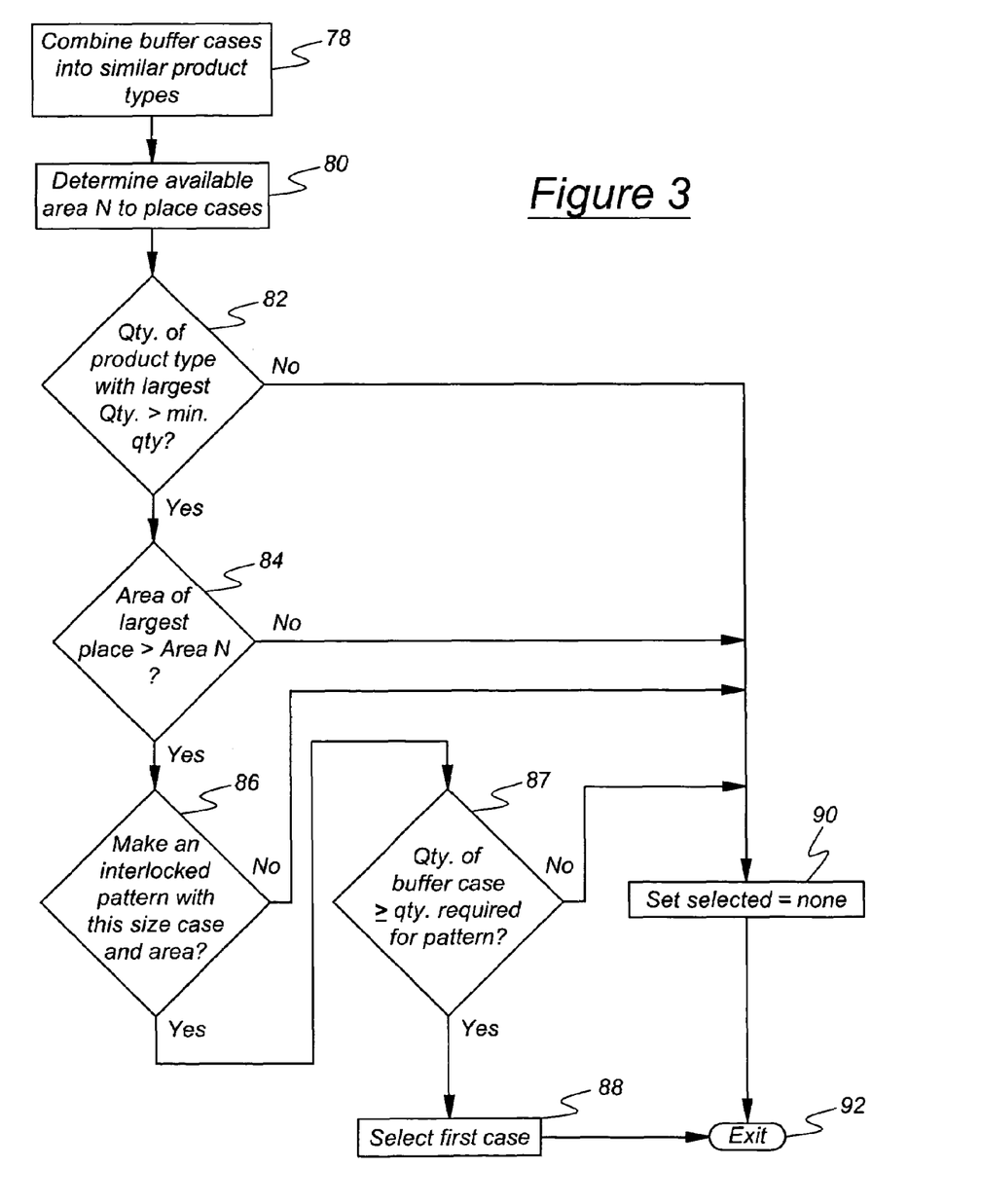
FIG. 3 is a logic flow chart illustrating the Full Layer Rule.
Figure 4:
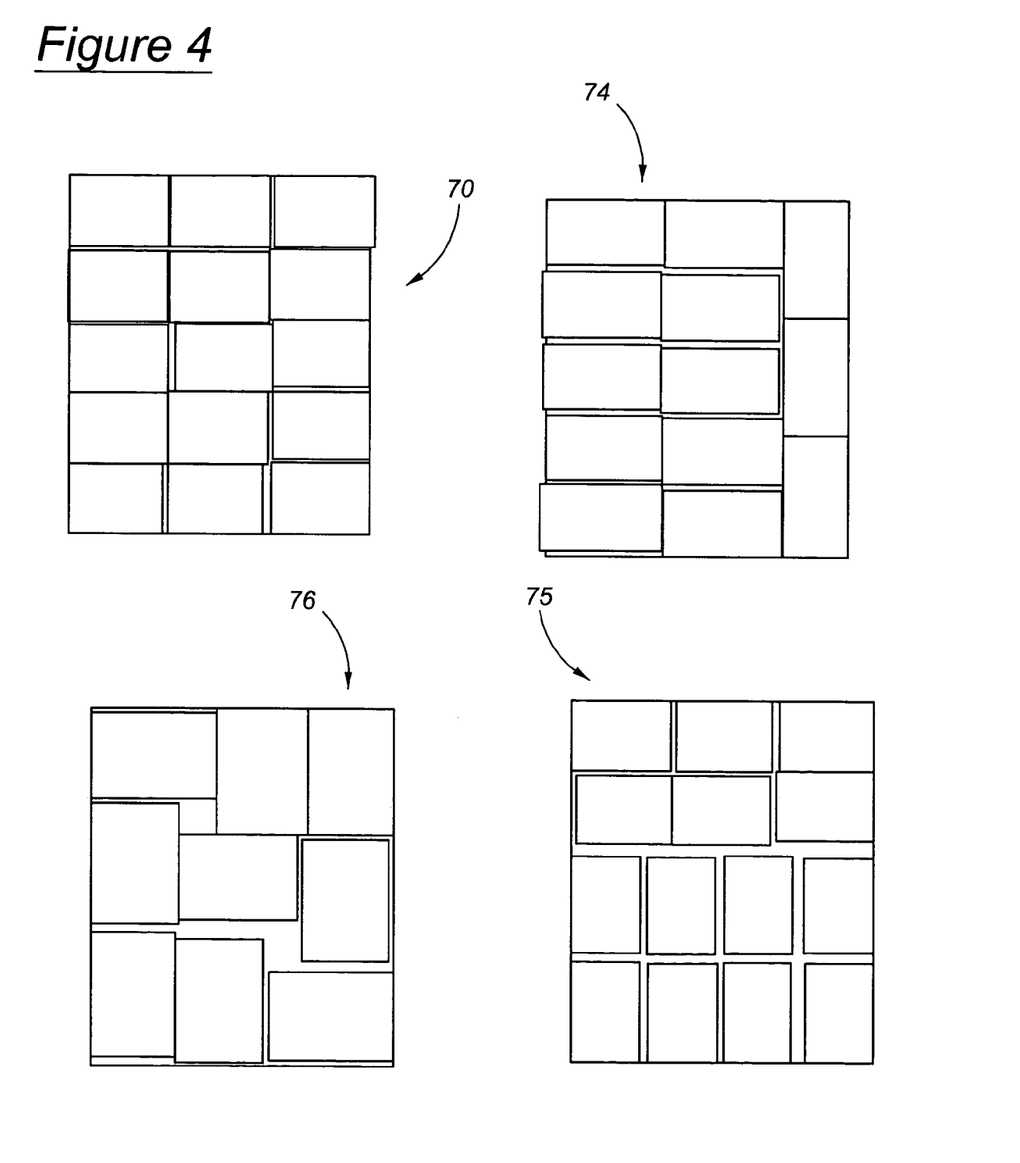
FIG. 4 shows applications of the Full Layer Rule and Full Region Rule.

In FIG. 3 at step 78, the cases in the buffer are grouped in the computer by product type, and at 80 the largest unfilled area at the current layer on the pallet is determined with reference to the computer model 32 of the pallet. Cases with the same product type include cases of different brands or flavors that have similar dimensions (length, width, and height) within allowable limits. A check is made at 82 to determine whether there is a sufficient number of cases of the product type of largest quantity in the buffer to meet a minimum quantity criteria. Another check is made at 84 to determine whether the available pallet storage area is greater than a minimum area. If both checks are logically true, at 86 a decision whether to form an interlocked pattern of the product type cases is made. If so, another check is made at 87 to determine whether enough cases are in the buffer to fill the available positions on the pallet or whether a sufficient number of cases will be sent to the buffer to fill the available positions. For example, if the area being filled requires ten cases, the buffer size is seven, and there are seven cases of the same product type in the buffer, the control algorithm assumes that more cases of the same product type are coming to the buffer. If so, at 88 a first case is selected, placed on the pallet, and the cases remaining in the buffer of this product type are serially placed on the pallet in an interlocking pattern until the area is filled. If any of the checks 82, 84, 86, 87 is logically false, control passes to 90, where no case is selected and the algorithm for this rule is exited at 92.

Figure 5:
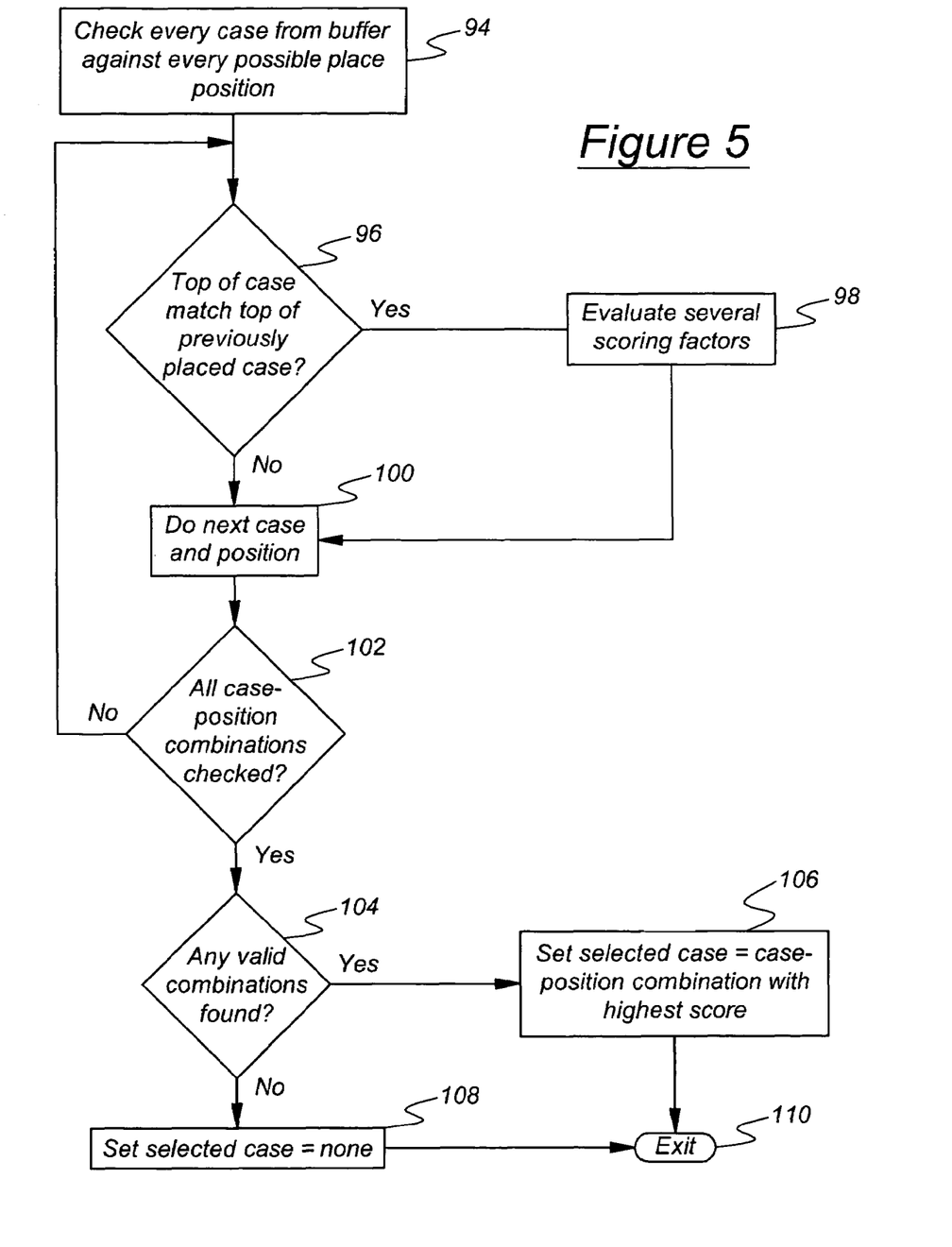
FIG. 5 is a logic flow chart illustrating the Adjacent Height Rule.

The Adjacent Height Rule, which is shown in FIG. 5, determines whether the top of a case in the buffer would have the same elevation as the top of a pallet case if the buffer case were placed at a position immediately adjacent to a pallet case. If the Adjacent Height Rule is satisfied, then the buffer case is placed on the pallet in the position. First, the height dimension of each buffer case is determined or recalled from memory, and a check is made at 94 for each position on the pallet against each buffer case. At 96, a check is made to determine whether the top of a buffer case (or multiple cases) would match the top of a pallet case if the buffer case(s) were placed on the pallet adjacent the subject pallet case.

If the result at step 96 is logically true, several scoring factors are evaluated at step 98. For example, in determining a position on the pallet that satisfies the Adjacent Height Rule for the next buffer case, an order of preference for a selected position may include the following factors: stability of the case, stability of the tower that includes the subject case, utilization of region, number of cases used, closeness of the match between the buffer case top and the tops of adjacent pallet cases, length of the edge of the buffer case whose top matches the pallet case top, and other appropriate factors.

If the result at 96 is logically false, the next buffer case and the available place positions are checked at 100 in the same way as the first buffer case until, at step 102, all buffer cases and place positions are checked. If a buffer case satisfies the Adjacent Height Rule, at step 104 the selected buffer case and place position with the highest score are combined, and the computer issues a command 106 that causes the robot arm to place the selected buffer case in the selected place position on the pallet. If no such combination is defined 108, the algorithm is exited at 110.

The Full Region Rule, which is set forth graphically and discussed next with reference to FIGS. 4 and 6, determines the product type of the cases in the buffer having the highest quantity that would best fill the lowest remaining region. The Full Region Rule is similar to the Full Layer rule except that a regular pattern 70 can be used and the size of the region can be smaller.

Figure 6:
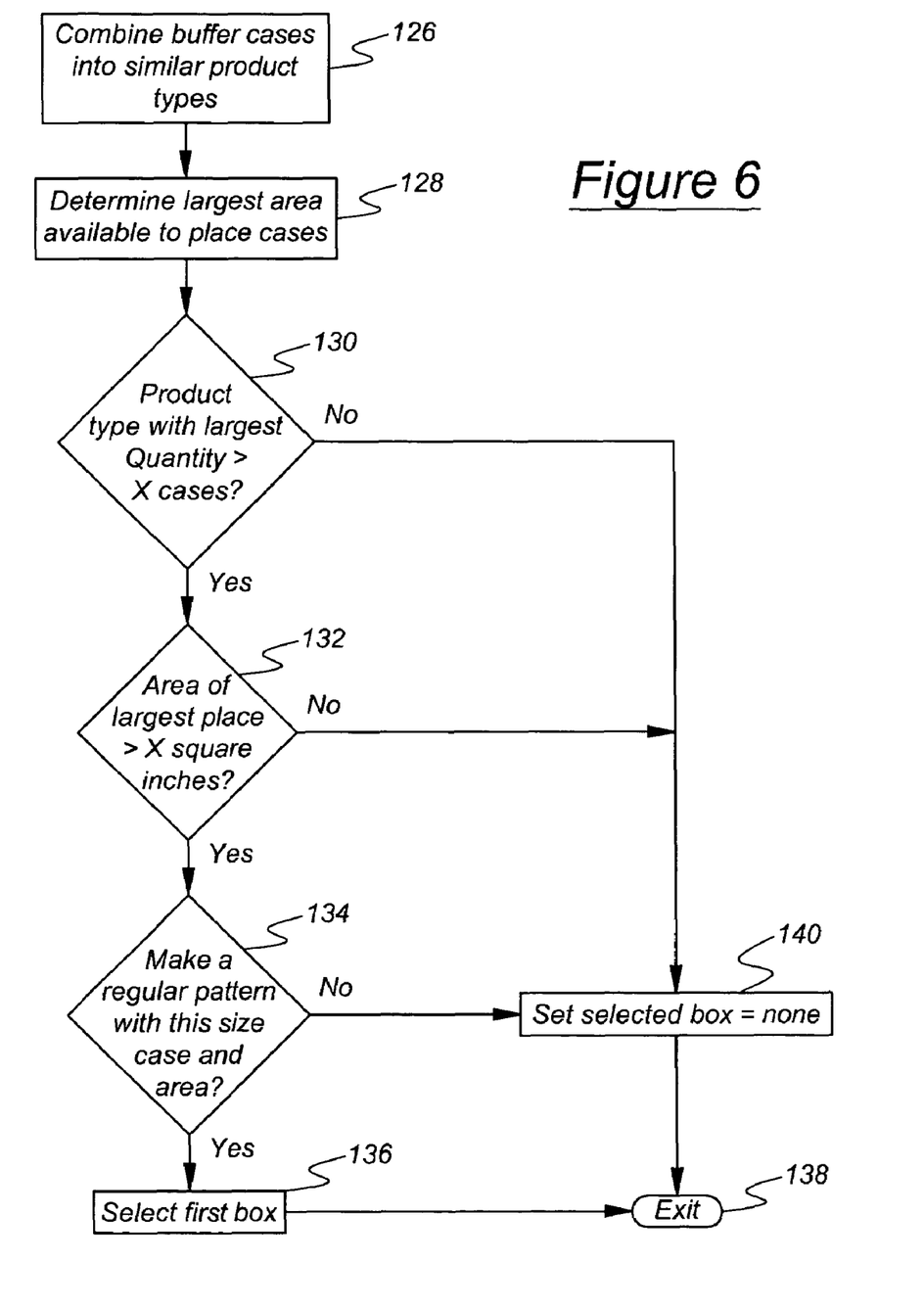
FIG. 6 is a logic flow chart illustrating the Full Region Rule.

Referring to FIG. 6, at step 126, the cases in the buffer are group by product type, and at 128 the largest area of a region on the lowest unfilled pallet layer is determined. A check is made at 130 to determine whether there is a sufficient number of cases of the product type of largest quantity in the buffer to fill the available region. Another check is made at 132 to determine whether the area of the available region is larger than the area of the product type. If both checks are logically true, at 134 a decision whether to form a regular pattern 70 of the buffer cases of the subject product type is made. If so, at 136 a first case is selected, placed on the pallet, and the algorithm is exited at 138. If any of the checks 130, 132, 134 is logically false, control passes to 140, where no case is selected and the algorithm for this rule is exited.

Figure 8:
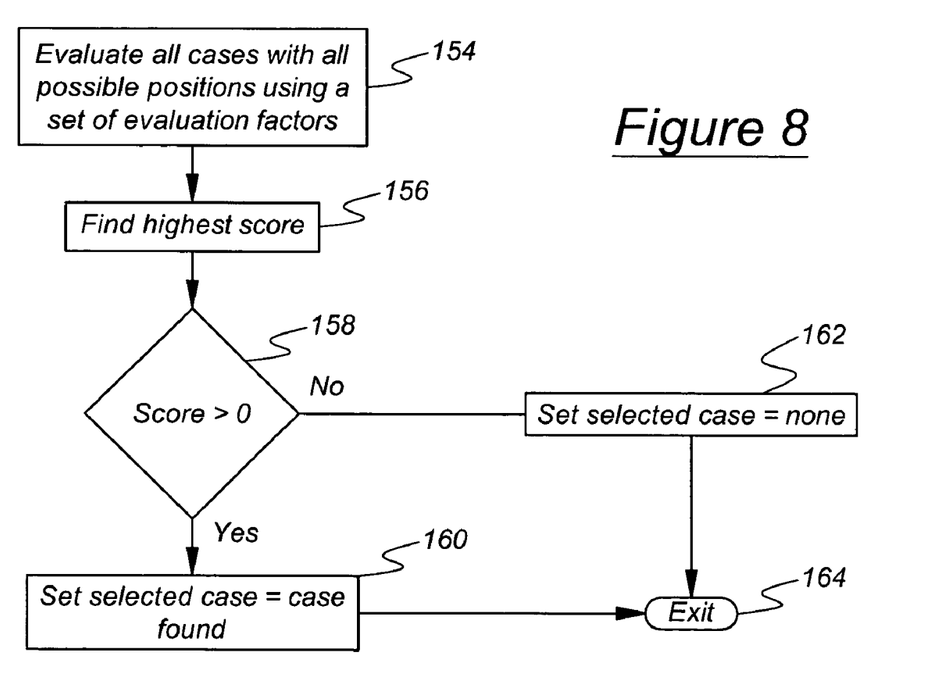
FIG. 8 is a logic flow chart illustrating the Best Score.

The Best Score Rule, which is set forth graphically and discussed next with reference to FIG. 8, applies a set of evaluation factors to the results produced by applying each of the rules. The entire buffer cases and all of the place positions are evaluated at step 154. The evaluation factors include for determining the outcome of the Best Score Rule include:

Max Height Exceeded (YES/NO)
Does Case Fit (YES/NO)
Dimension of the base of the case (0-100)
Creation of Blocked Space (0-100)
Horizontal Interlock (0-100)
Number of Similar product types (0-100)
Stability (0-100)
Minimum Stability (YES/NO)
Height on Pallet, Score goes down as height of case increases (0-100)
Support Area (0-100)
Minimum Supported Area (YES/NO)

Other appropriate factors can be applied to address unique requirements of a group of potential cases, or customer requirements.

The Best Score Rule is used to selected the buffer case and its place position on the pallet that is optimal for all the buffer cases currently available. The Best Score Rule reaches this result by evaluating at 154 every available buffer case at every possible place position, and finding at 156 the combination of case and place position having the highest score. Any of the listed factors that requires a Yes/No answer must receive a Yes answer, or the evaluated score is set equal to zero. Each of the other factors evaluates the buffer case-place position combination, and produces a score between 0-100. Each factor has a weight in the range 0.0-1.0. The score for each buffer case-place position combination is determined by multiplying the factor score times the corresponding weight.

$$\text{Score}=\text{Factor1}*\text{Weight1}+\text{Factor2}*\text{Weight2}+\ldots \text{FactorN}*\text{WeightN} \text{ wherein } N \text{ is the number of factors.}$$

The largest sum of the products of factor and weight for each buffer case-position combination is the best score. The case-position combination having the best score determines the selected case, which is then placed in the selected available pallet position.

The highest score is determined at step 156 using the evaluation factors. If the score is positive 158, at step 160, selected_case is set equal to case_found; otherwise, selected_case is set equal to "none" at 162, and the algorithm is exited at step 164.

Figure 7:
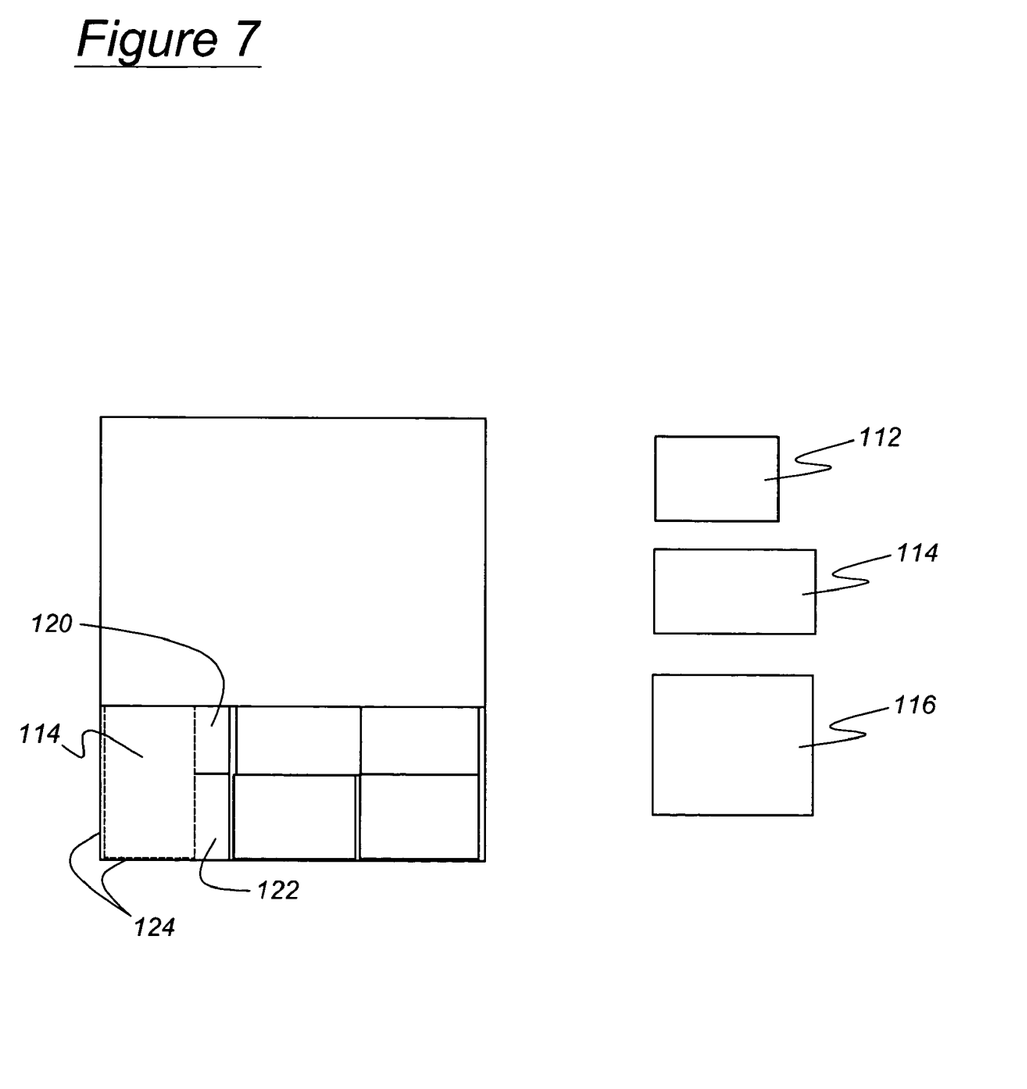
FIG. 7 shows an application of the Full Region Rule.

FIG. 7 illustrates a simple application of the Best Score Rule. The buffer contains cases 112, 114, and 116, and a remaining area on the lowest layer is the top surface of cases 120 and 122. The Best Score Rule would not select case 116 because it is too large when rotated in either direction. Case 112 is not selected because it would leave too much wasted space behind it or on the outside edge. Case 114 is selected under the Best Score Rule because it fits the available region and leaves an allowable gap behind it. The gap is allowable because it is small enough that another case can bridge across it.

Other rules can be added to meet additional unique conditions required by the potential cases or customer requirements. The added rules can be executed in any appropriate order with the other rules. Preferably, the rules are executed in a prioritized order that minimizes the length of computer execution time.

Dynamic Stability is continually checked while the pallet is being stacked with selected cases from the buffer as each rule is applied to determine whether a case should be placed on the pallet at an available pallet position. The stability criterion considers the dynamic conditions to which the pallet is subjected as it moves from place-to-place, particularly the effects of starting and stopping a fork truck carrying a stacked pallet, and the likelihood of cases falling from the pallet in transit. Every rule checks the stability of the placed case. Two measures of stability are considered: (a) stability of a tower that includes the subject buffer case located at the top of the tower; and (b) stability of a subject buffer case itself when located on the pallet.

If a case selected for placement by application of a rule would be unstable during pallet conveyance as determined by its failing a stability test, the case is not placed. Instead, another rule is applied to the case, and the result of that rule is checked for stability.

Figure 9:
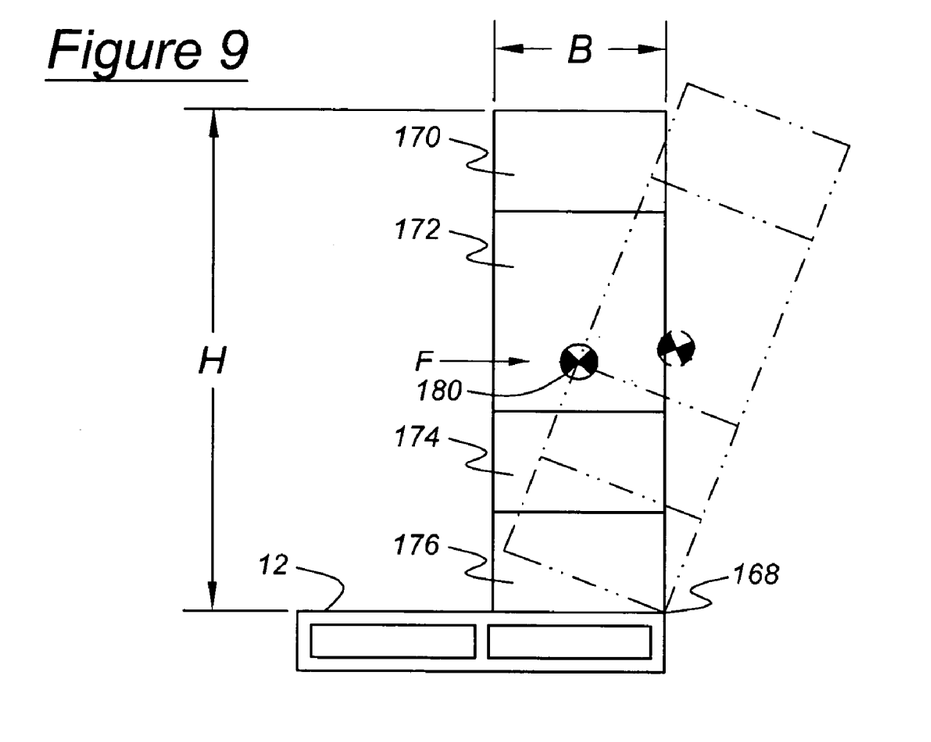
FIG. 9 shows a kinematic model of stacked cases demonstrating an application of a Stability Test.

Dynamic stability of a tower or column of cases stacked on a pallet 12 is determined by applying quantitative stability tests. FIG. 9 illustrates a tower including cases 170, 172, 174, 176 located at an edge 168 of a pallet 12. Each case has the same weight and base dimension, but the height of case 172 is twice the height of the other cases. A tip force (F), located at the geometric center of the tower height (H/2) represents an inertia force applied to the tower that would destabilize the tower causing its tipping to the illustrated position where the tower is supported at the pallet edge 168. The weight (W) of the tower is offset from the edge by one-half the width of the base dimension of the cases (B/2). The force F is offset from the edge by one-half of the tower height. Summing the moments produced by F and W about the edge 168, with the tower base parallel to the plane of the pallet supporting surface, and the inertia force F causing the tower to be supported only at the edge yields:

$$F=(B/2)*(\text{Weight}/CG)$$

Relating the tip force F to the mass of the tower to obtain a maximum acceleration yields:

$$\text{Max Tower Acceleration}=\text{Tip Force}/(\text{Weight}/\text{Gravity})$$

Assuming a tower of uniform density yields:

Max Tower Acceleration=$(B/2)$*(Weight/$CG$)/(Weight/Gravity)

Upon simplifying

Max Tower Acceleration=$(B/2)/(H/2)$*32 or

Stability(Max Tower Acceleration)=32*$B/H$ (1)

wherein Stability is the acceleration of the tower caused by the external force F, and the acceleration due to gravity is 32.0 ft/sec/sec. The tower is assumed to have a uniform density, and its center of gravity (CG) is assumed to be centered on the vertical axis of the tower. The external force represents the acceleration and deceleration caused by conveyor systems and lift trucks that carry the stacked pallet.

The magnitude of the Stability is used as a criterion for assessing the relative stability of various towers that are produced or could be produced while stacking buffer cases on the pallet. This stability determining principle is applied to the cases shown in FIG. 11, in which case 190 has a height of five units, cases 192 and 194 have a height of 15 units, the base of case 190 is 15 units, the base of case 192 is 15 units, and the base of case 194 is 10 units. For each buffer case, a low and high range of the base for cases underneath each selected buffer case is determined in both lateral directions. For example, case 190 has a base starting at 0 and extending to 25.

Stability of case 190 is determined on the basis of (1) individual stability because it is located at a pallet edge 168 with a height dimension of 5 and a base dimension of 15; and (2) tower stability using a height of 20 and a base of 25.

For a tower whose center of gravity is offset from its vertical axis, such as the tower of FIG. 11, its stability can be determined from Stability=32*(2*center of gravity to edge 168)/$H$ (2)

For example, the center of gravity of case 190 is substantially offset from the geometric center; therefore, a weighted average base dimension can be calculated thus ½Base=(15*25/2+5*15/2)/20=11.25

Stability, calculated using equation (2), is

Stability=32*2*11.25/20=36

Figure 10:
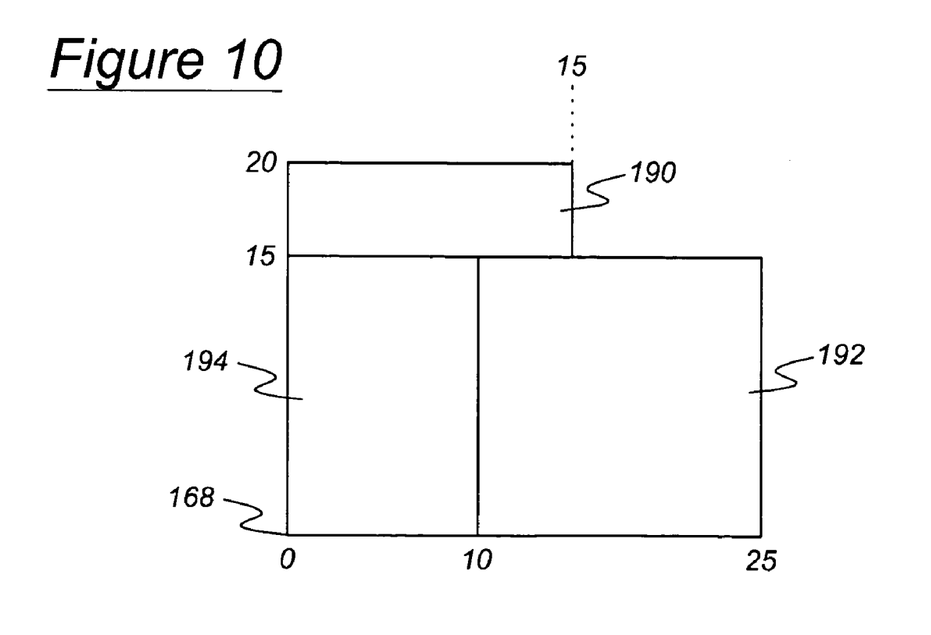
FIG. 10 illustrates applications of Stability Tests to a case tower that is non-centered.

Using the kinematic model of FIG. 10 and applying equation (1) to case 190

Stability(using full base)=32*25/20=40

The individual stability of case 190 is calculated from equation (1)

Stability=32*15/5=96

The control algorithm assigns a worst case stability of 36 to case 190 in the position of FIG. 10, saves a lower base dimension of 0.0 and a higher base dimension of 25 for future reference, and saves the location of the center of gravity for future reference.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for stacking cases on a pallet, the method comprising the steps of:
   supplying cases to a buffer in a random order without reordering the cases prior to placement on a pallet;
   defining rules for selecting a case from the buffer to be placed on the pallet and organizing the rules in a predetermined order;
   determining physical characteristics of the buffer cases including dimensions of a case base and a case height;
   determining available positions on the pallet where each buffer case can be placed on the pallet;
   using the physical characteristics of the buffer cases and applying the rules in the predetermined order to at least a portion of the buffer cases, wherein each rule application includes the steps of implementing a stability criterion for each random case and a three-dimensional region defining the currently available places providing optimal use of space on the pallet and ensuring stability of the stacked cases;
   identifying a selected buffer case that satisfies any one of the rules, including the stability criterion applicable to that rule, and a corresponding position on the pallet for the selected buffer case; and
   using an industrial robot, placing the selected buffer case on the pallet at the corresponding position before identifying another one of the buffer case.

2. The method of claim 1, further comprising:
   determining the rule that identified the last selected buffer case that was placed on the pallet; and
   reapplying the determined rule before applying another rule to a buffer case.

3. The method of claim 1, wherein the step of identifying a selected case and a corresponding position for the selected case to be placed on the pallet further comprises:
   applying the rules to cases in the buffer and the available positions;
   identifying the buffer cases and the corresponding positions that satisfy at least one rule;
   establishing factors related to the quality of the pallet stack that would result by placing a buffer case on the pallet;
   determining a relative importance of each factor;
   using the factors and their relative importance to determine from the identified buffer cases a selected buffer case and corresponding position having the highest weighted best score;
   placing the selected buffer case having the highest weighted best score in the corresponding position on the pallet.

4. The method of claim 1, wherein the step of identifying a selected case and a corresponding position for the selected case further comprises:
   determining a first measure of the stability of a tower of cases on which the selected case would be placed in the position;
   comparing the first measure of stability to a stability standard; and
   placing the selected case on the pallet in the corresponding position provided the first measure of stability meets or exceeds the stability standard.

5. The method of claim 1, wherein the step of identifying a selected case and a corresponding position for the selected further comprises:
   determining a first measure of the stability of a tower of cases on which the selected case would be placed in the position;

determining a second measure of the stability of the selected case when placed in the corresponding position on the pallet;

comparing the first and second measures of stability to respective stability standards; and placing the selected case on the pallet provided the first and second measures of stability meet or exceed the respective stability standards.

6. The method of claim 1, wherein the step of identifying a selected buffer case and a corresponding position where the selected case can be placed on the pallet further comprises:

determining a distance between a center of mass of a tower of cases stacked on the pallet that would include a buffer case that satisfies one of the rules and an edge at a base of said tower;

determining a height of said tower from the base;

using said distance and said height to determine a magnitude of a horizontal component of acceleration at the center of mass of the tower that would destabilize the tower when the tower is supported along said edge; and comparing the horizontal component of acceleration to an acceleration standard;

placing the selected case on the tower provided the horizontal component of acceleration meets or exceeds the acceleration standard.

7. The method of claim 1, wherein the step of identifying a selected buffer case and a corresponding position where the selected case can be placed on the pallet further comprises:

determining a distance between a center of mass of an identified buffer case that satisfies one of the rules and an edge at the base of said identified buffer case;

determining a height of said identified buffer case from the base of said identified buffer case;

using said distance and said height to determine a magnitude of a horizontal component of acceleration at the center of mass of said identified buffer case that would destabilize said identified buffer case when supported along said edge; and comparing the horizontal component of acceleration to an acceleration standard;

placing the selected case on the pallet in the corresponding position provided the horizontal component of acceleration meets or exceeds the acceleration standard.

8. The method of claim 1, wherein the step of identifying a selected case and a corresponding position for the selected case to be placed on the pallet further comprises:

applying the rules to cases in the buffer in relation to the available positions;

identifying the buffer cases and the corresponding positions that satisfy at least one rule;

determining a measure of the stability of respective towers of cases on which the identified cases would be placed in the corresponding positions;

comparing the measure of stability of each identified buffer case to determine a selected buffer case having the highest measure of stability; and placing the selected buffer case on the tower in the corresponding position.

9. The method of claim 1, wherein the step of determining available positions on the pallet where a buffer case can be placed further comprises:

continually updating available regions on the pallet where a buffer case can be placed as cases are placed on the pallet; and continually replenishing the buffer with cases after a buffer case is placed on the pallet.

10. A method for stacking cases on a pallet, the method comprising the steps of:

supplying cases to a buffer in a random order without reordering the cases prior to placement on a pallet;

defining rules for selecting cases from the buffer to be placed on the pallet;

determining physical characteristics of the buffer cases including dimensions of a case base and case height;

determining available locations on the pallet where each buffer case can be placed;

applying the rules sequentially in a variable prioritized order to at least a portion of the buffer cases and the available locations until at least one buffer case is identified;

identifying a selected buffer case that satisfies any one of the rules and a corresponding location on the pallet for the selected buffer case, wherein each rule application includes the steps of implementing a stability criterion for each random case and a three-dimensional region defining the currently available places providing optimal use of space on the pallet and ensuring stability of the stacked cases; and using an industrial robot, placing the selected buffer case on the pallet in the corresponding location before applying the rules sequentially to identify another one of the buffer cases.

11. The method of claim 10, further comprising:

repeatedly applying the rules in a variable prioritized order to the buffer cases;

repeatedly selecting for placement on the pallet a case that satisfies a rule; and repeatedly placing each case on the pallet in the corresponding location until the platform is filled with cases;

supplying an unfilled pallet; and continually replenishing the buffer with cases after a buffer case is placed on the pallet.

12. The method of claim 10, further comprising:

determining the rule that was satisfied by the last selected buffer case that was placed on the pallet; and reapplying the determined rule before applying another rule to a buffer case.

13. The method of claim 10, wherein the step of identifying a selected case and a corresponding location for the selected case further comprises:

applying the rules to cases in the buffer;

identifying the buffer cases that satisfy at least one rule and the corresponding location for the identified case;

establishing factors related to the quality of the pallet stack that would result by placing a buffer case on the pallet;

determining a relative importance of each factor;

using the factors and their relative importance to determine from the identified buffer cases a selected buffer case and corresponding location having the highest weighted best score;

placing the selected buffer case having the highest weighted best score in the corresponding location on the pallet.

14. The method of claim 10, wherein the step of identifying a selected case and a corresponding location for the selected case further comprises:

determining a first measure of the stability of a tower of cases on which the selected case would be placed in the location;

comparing the first measure of stability to a stability standard; and placing the selected case in the corresponding location pallet provided the first measure of stability meets or exceeds the stability standard.

15. The method of claim 10, wherein the step of identifying a selected case and a corresponding location for the selected case comprises:

determining a first measure of the stability of a tower of cases on which the selected case would be placed in the location;

determining a second measure of the stability of the selected case when placed in the corresponding location on the pallet;

comparing the first and second measures of stability to respective stability standards; and placing the selected case in the corresponding location provided the first and second measures of stability meet or exceed the respective stability standards.

16. The method of claim 10, wherein the step of identifying a selected buffer case and a corresponding location comprises:

determining a distance between a center of mass of a tower of cases stacked on the pallet that would include an identified buffer case and an edge at a base of said tower;

determining a height of said tower from the base of said tower;

using said distance and said height to determine a magnitude of a horizontal component of acceleration at the center of mass of the tower that would destabilize the tower when the tower is supported along said edge; and comparing the horizontal component of acceleration to an acceleration standard;

placing the selected case on the tower provided the horizontal component of acceleration meets or exceeds the acceleration standard.

17. The method of claim 10, wherein the step of identifying a selected buffer case and a corresponding location where the selected case can be placed on the pallet further comprises:

determining a distance between a center of mass of an identified buffer case that satisfies one of the rules and an edge at the base of said identified buffer case;

determining a height of said identified buffer case from the base of said identified buffer case;

using said distance and said height to determine a magnitude of a horizontal component of acceleration at the center of mass of said identified buffer case that would destabilize said identified buffer case when supported along said edge; and comparing the horizontal component of acceleration to an acceleration standard;

placing the selected case on the pallet in the corresponding location provided the horizontal component of acceleration meets or exceeds the acceleration standard.

18. The method of claim 10, wherein the step of identifying a selected case and a corresponding location for the selected case to be placed on the pallet further comprises:

applying the rules to cases in the butler in relation to the available locations;

identifying the buffer cases and the corresponding locations that satisfy at least one rule;

determining a measure of the stability of respective towers of cases on which the identified cases would be placed in the corresponding locations;

comparing the measure of stability of each identified buffer case to determine a selected buffer case having the highest measure of stability; and placing the selected buffer case on the tower in the corresponding location.

19. The method of claim 10, wherein the step of determining available locations on the pallet where a buffer case can be placed further comprises:

continually updating available regions on the pallet where a buffer case can be placed as cases are placed on the pallet.

20. A method for stacking cases on a pallet, the pallet including at least one case stacked thereon, the method comprising the steps of:

supplying cases to a buffer in a random order without reordering the cases prior to placement on a pallet;

determining physical characteristics of cases in the buffer including dimensions of a case height;

determining physical characteristics of the at least one case in the pallet including dimensions of a case height;

comparing the physical characteristics of at least one of the cases in the buffer to the at least one case on the pallet;

identifying one of said pallet cases having a case height equal to a case height of a selected buffer case and a corresponding position adjacent the one pallet case for the selected case, wherein the identifying step includes the steps of implementing a stability criterion for each random case and a three-dimensional region defining the currently available places providing optimal use of space on the pallet and ensuring stability of the stacked cases; and using an industrial robot, placing the selected buffer case on the pallet at the corresponding position before identifying another one of the buffer cases.

21. An automated method for stacking random cases on a pallet comprising the steps of:

randomly providing cases along a conveyor system;

conveying the random cases to a buffer;

determining dimensions characteristics of each random case in the buffer;

executing a priority sequence at the highest priority rule, wherein the priority sequence includes the steps of implementing a stability criterion for each random case and a three-dimensional region defining the currently available places providing optimal use of space on the pallet and ensuring stability of the stacked cases;

evaluating the highest priority rule based on each random case in the buffer and the regions available for placing cases on the pallet;

determining a position on the pallet for at least one case in the buffer;

with an industrial robot, placing a selected case on the pallet in a selected position within an available region;

exiting the highest priority rule;

refilling the buffer with cases;

repeating the execution and evaluation of the highest priority rule, including implementing a stability criterion for each random case and defining a region, based on each case in the refilled buffer and the updated regions available for placing cases on the pallet;

applying a second sequential priority rule when a position is not available for at least one case in the buffer after evaluating the highest priority rule, and including the steps of:

evaluating a subsequent sequential priority rule based on each case in the buffer and the regions available for placing cases on the pallet wherein the priority sequence includes the steps of implementing a stability criterion for each random case and a three-dimensional region defining the currently available places providing optimal use of space on the pallet and ensuring stability of the stacked cases;

determining a position on the pallet for at least one case in the buffer;

with an industrial robot, placing a selected case on the pallet in a selected position within an available region; and exiting the subsequent sequential priority rule.

22. The automated method of palletizing cases of claim 21, further comprising the step of after the step of existing any priority rule, reprioritizing the sequential priority rule to set the highest priority rule.

* * * * *